…

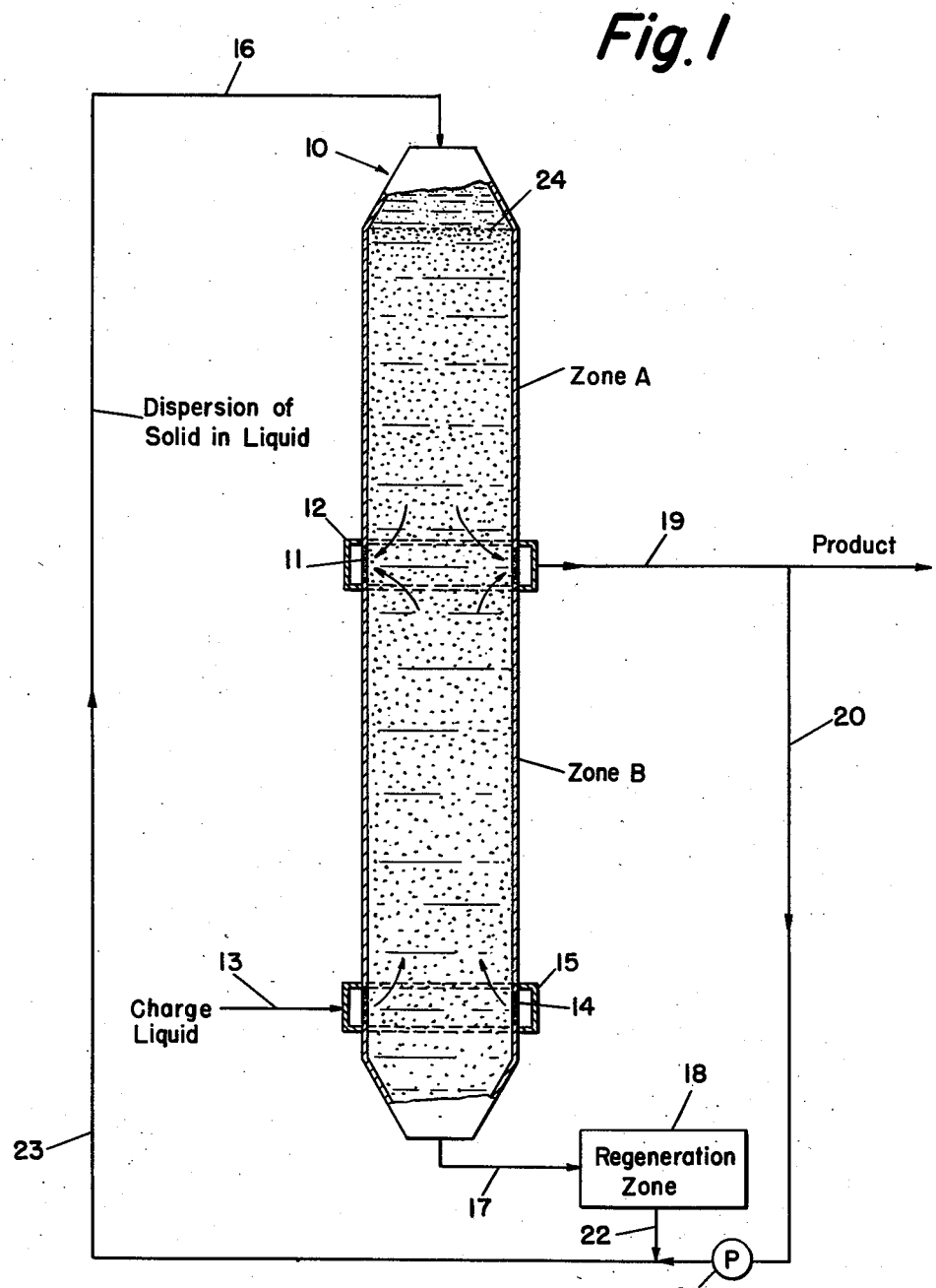

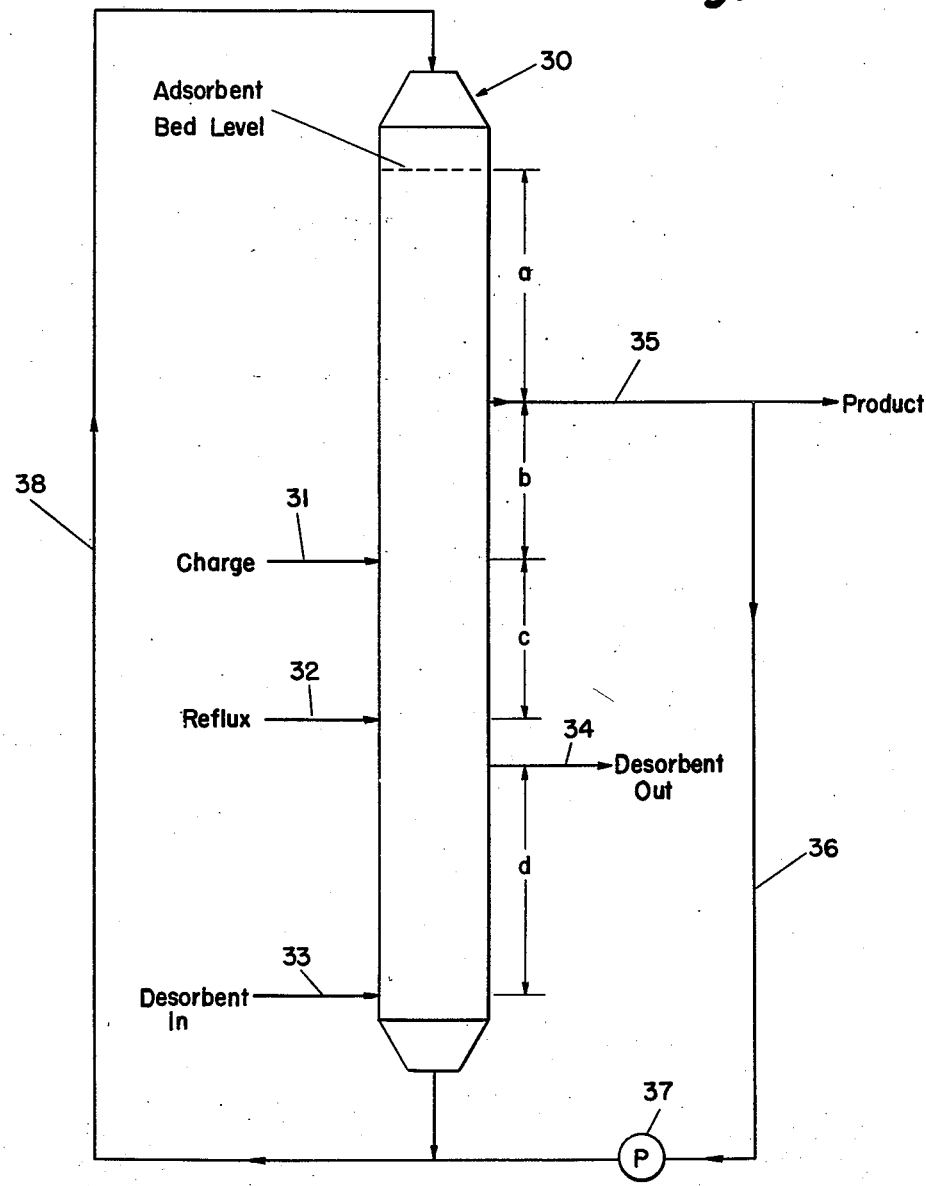

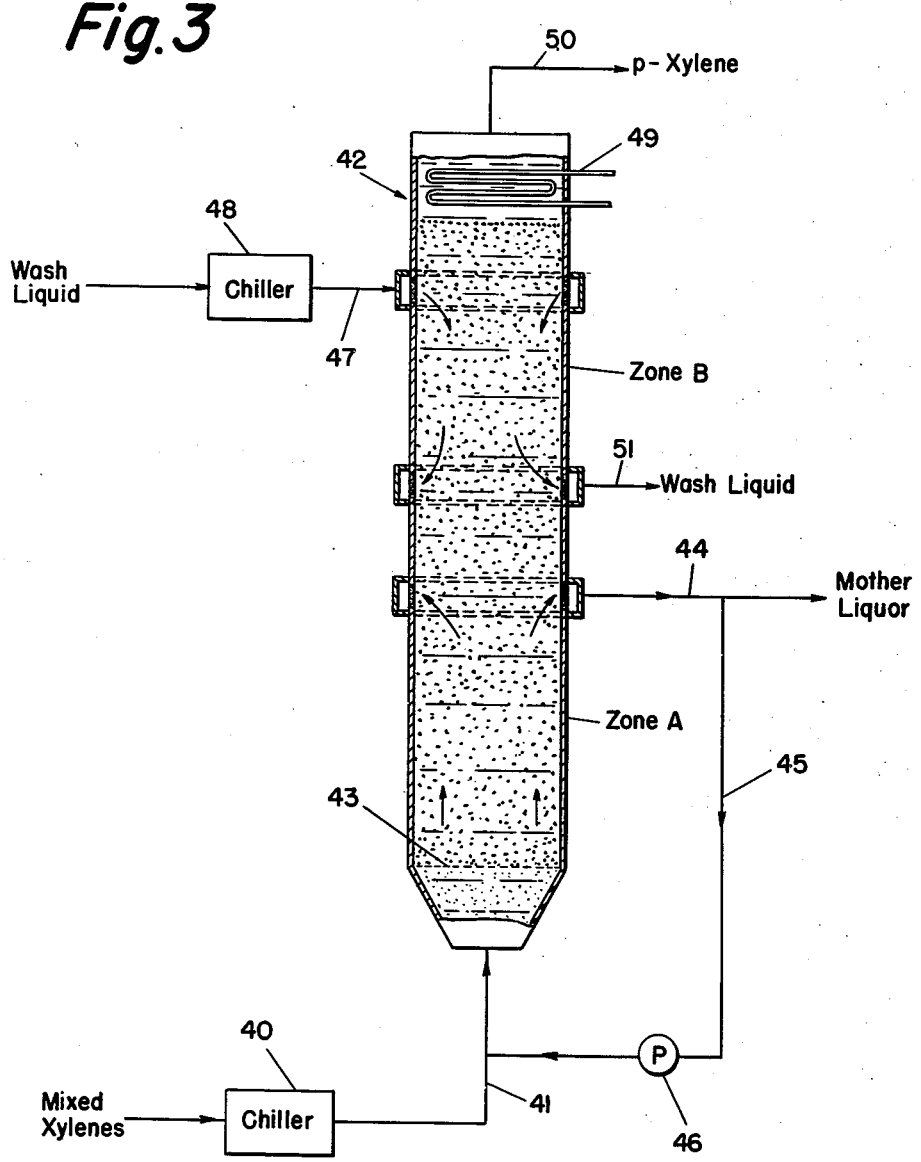

United States Patent Office 2,813,781
Patented Nov. 19, 1957

2,813,781

COUNTERCURRENT CONTACT OF LIQUID AND SOLID

Thomas S. Mertes, Wilmington, Del., assignor to Sun Oil Company, Philadelphia, Pa., a corporation of New Jersey Application December 15, 1953, Serial No. 398,273

2 Claims. (Cl. 23—310)

This invention relates to the art of countercurrently contacting granular solids with liquids and more particularly concerns countercurrent contacting operations conducted in a column wherein the solid material is maintained in the form of a moving bed.

There are many types of processing operations involving the contact of a granular solid with one or more liquids. Examples may readily be found in the fields of adsorption, ion-exchange, crystallization and elsewhere. In many of these operations countercurrent contact of the solid and liquid materials is necessary for, or at least is greatly advantageous in, achieving the desired results. For example, in the selective adsorption of organic compounds from each other by means of suitable adsorbents, batch contact between the solid and liquid often will not be effective to make the desired separation, and a countercurrent type of contact providing a number of theoretical transfer stages between the solid and liquid phases will be required to separate the compounds in the desired purities and yields.

Countercurrent contacting of granular solid with liquid involves the problem of how to move the granular material through the system at the desired rate. Flow of the solid particles by gravity downwardly through a column countercurrent to the liquid is one commonly employed procedure; but its applicability is limited to relatively low flow rates per unit cross-sectional column area due to the tendency of the upflowing liquid to lift the solid particles. Various mechanical devices have been used for transporting granular solids through countercurrent systems, examples being bucket elevators, screw conveyors, belt conveyors, scraping blades, reciprocating pistons and the like. In some instances these devices have been employed in an attempt to obtain higher countercurrent throughputs of particles and fluid than would be possible merely by gravity flow of the particles. Mechanical devices, however, have numerous disadvantages including the costs of constructing and operating, mechanical wear and breakdown with interruption of service, in some cases intermittent rather than continuous flow, etc.

The present invention is directed to a procedure for effecting countercurrent flow of liquid with solid particles maintained in the form of a moving bed, without the employment of mechanical devices such as referred to above. Movement of the particles in the countercurrent zone is achieved according to the invention by providing additionally in the column a concurrent flow zone and utilizing the frictional force of liquid flowing faster than the solid in this zone as the motivating force for moving the solid through the countercurrent zone. By this procedure unusually high rates of solid and liquid flow can readily be maintained in the countercurrent zone without the use of any mechanical device for forcing the solid to move at the desired rate against the liquid stream.

The procedure according to the invention may be described more particularly by considering a system involving a vertical column having a countercurrent zone through which the granular solid is to flow downwardly while the liquid to be contacted therewith flows upwardly. In the column there is provided above the countercurrent zone another zone for concurrent downward flow of the granular solid and a carrier liquid. For convenience the concurrent zone may be referred to as zone A while the countercurrent contacting zone may be designated as zone B. The liquid to be contacted is fed into the bottom of zone B and the product resulting from the countercurrent contacting is withdrawn from the column adjacent the top of zone B. The granular solid is fed into the top of the column preferably as a dispersion in the carrier liquid. The carrier liquid flows downwardly in zone A at a velocity faster than that of the solid material and is withdrawn from the column adjacent the bottom of zone A. The solid material is maintained within the column as a continuous moving bed having its upper level within zone A and extending downwardly throughout zone B. The height of the bed within zone A and the rate of downflow of carrier liquid therein are regulated so as to secure sufficient frictional force to provide the driving force necessary for moving the solid bed through zone B. This frictional force is transmitted accumulatively particle to particle downwardly through the bed so that the resultant downward force on the particles within zone B is greater than the upward force exerted by the upflowing liquid. Hence, in this manner the necessary force for maintaining and moving the particles in bed form in zone B even against high liquid counterflow rates can readily be obtained. Solid material is withdrawn from the base of the column at such rate as to maintain the desired bed length within zone A.

Several specific embodiments of the invention are illustrated in the accompanying drawings in which:

Fig. 1 is a generally diagrammatic illustration of one manner of conducting a countercurrent contacting process, with the contacting column shown partly broken away to illustrate conditions therein;

Fig. 2 is a diagrammatic illustration of an adsorption-desorption process for separating organic compounds; and Fig. 3 is a diagrammatic illustration of a crystallization process involving countercurrent washing of the crystals with a wash liquid.

Referring to Fig. 1, 10 illustrates a column for use in countercurrently treating a liquid with a granular solid. The operation may involve, for example, the contacting of an oil with an adsorbent or the treatment of water with an ion-exchange material or any other similar solid-liquid contacting operation where countercurrent contact is desired. The column has an upper portion constituting the concurrent downward flow zone A and a lower portion constituting the countercurrent contacting zone B. At the junction of zones A and B, means are provided for withdrawing both the liquid which flows downwardly through zone A and the liquid product of the contacting operation in zone B. As shown in Fig. 1, such means may comprise a screen 11, positioned at one or more openings in the wall of column 10, having a mesh size such that the liquid can pass from the column while the solid particles are retained, and a ring closure member 12 surrounding the screen and secured to the column. Charge liquid is introduced into a lower part of the column through line 13 by means of a similar arrangement comprising screen 14 and ring 15.

The granular solid material is fed into the top of column 10 through line 16 as a dispersion in carrier liquid, and the solid after contact with charge liquid in zone B is removed from the base of the column in any suitable manner as indicated by line 17. The column is substantially free of any obstructions such as baffles or the like, so that it provides an unobstructed path for continuous movement of the bed of solid particles throughout zones A and B.

Depending upon the particular type of process being conducted, it may be desirable to regenerate the solid for re-use in the system and this may be done as indicated by regeneration zone 18. Specific details of regenerating procedures are well known in the art for various types of processes and need not be described here as such details have no bearing on the present invention. Suffice it to say that if it is desired to conduct the regeneration in zone 18 by countercurrently treating the solid with a suitable liquid, another column operated in a manner similar to column 10 may be used. The regenerated solid may be transported in any manner desired back to column 10 for re-use. It is distinctly advantageous, however, to utilize as the transport medium a portion of the liquid product which issues from the column through line 19. Such portion is passed through line 20 and pump 21 and picks up solid particles flowing through line 22 from regenerator 18, and the resulting dispersion of solid particles in the liquid carrier is sent through lines 23 and 16 to the top of column 10. By operating in this manner, the product liquid serves both as the medium for transporting the solid particles back to the column and as the liquid which, by friction with the solid material in zone A, generates the force for moving the solid as a bed through zone B. Hence the supply of another liquid from an extraneous source is obviated.

Operation of column 10 according to the invention is as follows: The solid particles enter the top of the column as a dispersion in the carrier liquid and pass downwardly with the liquid until they reach the upper surface of the bed as indicated at 24. The particles then become a part of the bed and move at reduced velocity, while the liquid passes at higher velocity downwardly through the bed to the bottom of concurrent flow zone A at which level it is removed from the column through line 19. The solid is maintained as a bed, moving in a substantially unobstructed path continuously from its upper level 24 down throughout zone B, by the combined effect of gravity (assuming that the solid is heavier than the liquid) and the frictional force developed in zone A. While the charge liquid which flows upwardly through zone B has a tendency to lift the particles, its effect is overcome by the combined downward forces of gravity and friction in zone A. This result is insured by regulating the height of the bed in zone A and the rate of liquid downflow therein to generate the necessary downward force to maintain the particles within zone B in bed form. Increase in the height of the bed increases this force as also does an increase in the liquid rate through zone A. The power for driving the solid bed through column 10 against the upflowing liquid in zone B is thus, in reality, supplied by the pump 21.

It will be understood that the invention is not limited to the precise operating procedure described above in connection with Fig. 1 and that various modifications are permissible. For example, the solid particles could be fed into the top of the column separately from the liquid introduced thereto or the solid material may pass through the column only once without being recycled. Again, instead of using a portion of the liquid product as the liquid for developing the required frictional force in zone A, a different liquid from an outside source could be employed, in which event it might be desirable to provide means for separating the liquid material from line 19 into its two liquid components, such as by distillation, decantation or the like. The procedure can also be varied so that the flow of the solid and the flows of the carrier and charge liquids are in directions opposite to those illustrated for Fig. 1. In cases where the charge liquid is heavier than the solid particles, it usually will be preferable to feed the solid and carrier liquid into the bottom of the column and pass the solid upwardly as a moving bed against downwardly flowing charge liquid. However, if desirable, flow in such directions can be utilized when the particles are heavier than the liquid if the carrier liquid velocity is sufficiently high to maintain and move the solid bed upwardly through the column.

Fig. 2 diagrammatically illustrates a process involving both adsorption and desorption steps for separating a liquid charge into its components by means of a granular adsorbent. For example the process may be for the purpose of separating a petroleum hydrocarbon stock into aromatic and non-aromatic portions by means of a selective adsorbent such as silica gel. The process utilizes a column 30 which has four distinct flow zones indicated by the letters a, b, c, and d. Zone a is a concurrent downward flow section wherein the force necessary for moving the solid bed downwardly is generated. Zone b is the countercurrent zone for contacting the charge, entering through line 31, with adsorbent to effect selective adsorption of the aromatic component. Zone c is an aromatic-enriching zone wherein increase in purity of the adsorbed material is achieved by means of aromatic reflux which is fed to the column through line 32 and passed upwardly against the downflowing adsorbent. The use of reflux in a process of this kind is well known and is disclosed, for example, in Ockert Patent No. 2,614,133. Zone d in the lower part of column 30 is a desorption zone to which a suitable desorbent liquid is fed via line 33. The desorbent moves countercurrently to the adsorbent and is then withdrawn from the column through line 34 in admixture with the desorbed aromatic component. The mixture from line 34 may be sent to a distillation unit (not shown) for separation and recovery of the desorbent. A portion of the non-aromatic product obtained from the column through line 35 may be circulated through line 36 and pump 37 for use as the carrier liquid for transporting the adsorbent back to the top of the column by means of line 38, as described in connection with Fig. 1.

In the process of Fig. 2 it should be noted that resistance to continuous downward movement of the adsorbent bed develops not only from the upflow of charge liquid in zone b but also from the flows of reflux in zone c and desorbent in zone d. In this case the height of the bed in zone a and the rate of liquid downflow therein is regulated so as to provide sufficient downward force to overcome the combined resistances in zones b, c, and d.

Fig. 3 illustrates a crystallization process wherein it is desired to wash the crystals countercurrently with a suitable wash liquid, and it is herein described more specifically in connection with the selective crystallization of para-xylene from a xylene mixture containing also meta-xylene.

The mixed xylene charge first enters a chiller 40 wherein its temperature is reduced sufficiently to cause crystallization of para-xylene without substantial crystallization of the meta-para eutectic mixture. The chilling may, for example, bring the temperature down to minus 80–85° F. The chilled mixture is then passed through line 41 into the bottom of column 42 which has a concurrent upflow zone A and a countercurrent flow zone B. A bed of crystals is established in column 42 with its lower level as indicated at 43. Mother liquor containing most of the meta-xylene and a portion of the para-xylene is withdrawn from the column at the upper end of zone A through line 44. A portion of this mother liquor is circulated through line 45 and pump 46 back to the bottom of the column to supply sufficient liquid flowing through the crystal bed in zone A to develop the force necessary for continuously moving the bed upwardly.

Adjacent the upper end of zone B a wash liquid is introduced through line 47 for flow downwardly countercurrent to the crystal bed. Prior to its introduction the wash liquid is cooled in chiller 48 to a temperature about the same as that of the crystal bed in zone B. A particularly suitable wash liquid for this purpose is toluene, although any other hydrocarbon which is liquid at the desired operating temperature and which has a suitable boiling point, such as butane or pentane, can be used. In flowing downwardly through the crystal bed in zone B the wash liquid displaces any mother liquor retained in the crystal mass, and also generally dissolves a small amount of the crystallized para-xylene. The wash liquid and dissolved material are removed from the column through line 51, and may be sent to a distillation unit (not shown) for separation of the wash liquid. The xylene material thus obtained may be recycled to the process for recrystallization if its para-xylene content is sufficient.

Means are provided for melting the purified para-xylene crystals after they have passed upwardly from wash zone B. As shown in Fig. 3, this may comprise heating coils 49 in the top of column 42. The liquid product is then withdrawn from the top of the column through line 50, and it may also be sent to a distillation unit (not shown) for stripping out any of the wash liquid that may have remained in the product. Instead of providing heating coils within the column, a heat exchanger located outside of the column and through which the liquid product is passed with a portion then being returned to the top of the column may be provided. In either event the upper part of column 42 contains product in liquid form above the crystal bed.

The processes described above are merely examples of how the present invention can be practiced, and it will be understood that the present invention has wide application for operations involving the countercurrent flow of a particulate solid and one or more liquids.

I claim:

1. Method of countercurrently contacting a liquid with a particulate solid material in a column having a concurrent flow zone A and a countercurrent contacting zone B, which method comprises: passing liquid for countercurrent contact with solid through zone B in a direction toward zone A and withdrawing the product from the column adjacent that end of zone B which is nearest to zone A; passing a carrier liquid through zone A in a direction toward zone B and withdrawing it from the column adjacent that end of zone A which is nearest to zone B; feeding particulate solid into the column along with said carrier liquid; maintaining the solid as a continuous moving bed extending from within zone A throughout zone B by regulating the length of the bed within zone A and the rate of carrier liquid therein such that the frictional force of the carrier liquid on the solid particles within zone A is sufficient to maintain and move the particles as a bed in opposition to the opposing frictional force exerted by the counterflowing liquid in zone B, and withdrawing contacted solid from zone B at a rate to maintain said length of the bed within zone A.

2. Method of countercurrently contacting a liquid with a particulate solid material in a vertical column having in its upper part a concurrent downward flow zone A and, beneath said zone, a countercurrent contacting zone B, which method comprises: passing liquid for countercurrent contact with solid upwardly through zone B and withdrawing the product from the column adjacent the top of zone B; passing a carrier liquid downwardly through zone A and withdrawing it from the column adjacent the bottom of zone A; feeding particulate solid into the top of the column as a dispersion in said carrier liquid; maintaining the solid as a continuous moving bed having its upper level within zone A and extending downwardly throughout zone B by regulating the height of the bed within zone A and the rate of downflow of carrier liquid therein such that the downward frictional force of the carrier liquid on the solid particles within zone A is sufficient to maintain the solid particles in bed form and move the bed downwardly in opposition to the upward frictional force exerted by the upflowing liquid in zone B, and withdrawing contacted solid from the column beneath zone B at a rate to maintain said height of the bed.

References Cited in the file of this patent

UNITED STATES PATENTS

| | | |
|---|---|---|
| 2,614,133 | Ockert | Oct. 14, 1952 |
| 2,644,018 | Harper | June 30, 1953 |
| 2,679,539 | McKay | May 25, 1954 |
| 2,696,510 | Weedman | Dec. 7, 1954 |